No. 750,213. Patented January 19, 1904.

UNITED STATES PATENT OFFICE.

CHARLES MOUREU, OF PARIS, FRANCE.

ETHER OF PROPIOLIC ACID, &c.

SPECIFICATION forming part of Letters Patent No. 750,213, dated January 19, 1904.

Original application filed July 19, 1901, Serial No. 68,944. Divided and this application filed August 8, 1903. Serial No. 168,821.

(No specimens.)

*To all whom it may concern:*

Be it known that I, CHARLES MOUREU, of Paris, France, have invented a new and useful Ether of Propiolic Acid and Derivatives, which invention is fully set forth in the following specification.

In my application, filed July 19, 1901, Serial No. 68,944, (whereof the present application is a division,) I have claimed that the hexyl propiolic acid gives various derivatives useful in perfumery, confectionery, soap manufacture, &c. I have particularly found that the ethers of this acid and those of the corresponding beta-ketonic acid possess such qualities.

The ethers of the hexyl propiolic acid can be prepared, fiirst, by the well-known etherification method, for example, by heating the alcohol with the acid or the chlorid of the same or by using an etherification agent, such as sulfuric acid; second, by starting directly from the metal compounds of the hydrocarbon by the action of the chloroformic ether ClCOOR.

Example: Ten parts of the hexyl propiolic acid are mixed with ten parts of one-hundred-per cent, alcohol and one part of concentrated sulfuric acid. The mixture is heated during thirty-six hours in a steam-bath. (In using larger quantities of sulfuric acid the time of the heating may be reduced.) After cooling one dilutes with a solution of salt in water and extracts with a suitable solvent—*i. e.*, ether. The etheric solution is washed with an alkaline solution to recover the acid not transformed in its ether. The solvent is distilled off and the residue (the raw ether) rectified *in vacuo*. This ether when treated with sulfuric acid and the product of the reaction is poured into water gives the corresponding beta-ketonic ether by fixation of a molecule of water. The same beta-ketonic ether

can also be obtained by submitting the acid to the action of alkalies in aqueous solution and afterward etherifying the beta-ketonic acid obtained. For example, the operation may be as follows: The acid is heated with an excess of potash in alcoholic solution for some hours, the liquor is diluted with water, acidulated with a strong acid, (for example, sulfuric acid,) and is extracted with ether or other appropriate solvent. The etheric solution is washed with water and dried, the ether is evaporated in the cold, (for example, *in vacuo*,) and the residue thus obtained, in general solid, is etherified in the cold by saturating its alcoholic solution with hydrochloric-acid gas. The beta-ketonic ether produced is finally rectified by distillation *in vacuo*.

The ethers of the beta-ketonic acid possess the following characteristics: Methylic ether distils at about 128° to 130° under sixteen to eighteen millimeters pressure; density 0.982. Ethylic ether distils at about 135° to 138° at sixteen to eighteen millimeters pressure; density 0.9659. The ethers of the acid

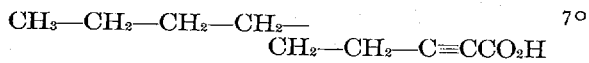

possess the following characteristics: Methylic ether distils at 121° to 123° under nineteen millimeters pressure; density at 0° 0.933. Ethylic ether distils at 126° to 128° under sixteen millimeters pressure; density at 0° 0.922. Isopropylic ether distils at 145° to 149° under thirty-one millimeters pressure; density at 0° 0.910. Isoamylic ether distils at 167° to 172° under twenty-six millimeters pressure; density at 0°0.907. All of these ethers are oily, colorless, or practically colorless transparent liquids which are not crystallizable by ordinary methods at temperatures above 0° centigrade, having an agreeable aroma, and are suitable for employment more particularly in the manufacture of essences, perfumery, confectionery, soap, and similar products. They are almost insoluble in water, easily soluble in alcohol, ether, benzene, and gasolene.

Having now fully described my said invention, what I claim is—

1. An ether of hexyl propiolic acid of the type

R being an alcoholic radical, said ethers being oily, colorless or practically colorless transparent liquids of agreeable aroma, non-crystallizable by ordinary methods at temperatures above 0° centigrade, almost insoluble in water, easily soluble in alcohol, ether, benzene and gasolene, and having the properties and characteristics herein specified.

2. A beta-ketonic ether of hexyl propiolic acid of the type $$R.CO_2CH_2CO\ CH_2CH_2CH_2CH_2CH_2CH,$$

R being an alcoholic radical, said ethers being oily, colorless or practically colorless transparent liquids of agreeable aroma, non-crystallizable by ordinary methods at temperatures above 0° centigrade, almost insoluble in water, easily soluble in alcohol, ether, benzol and gasolene, and having the properties and characteristics herein specified.

In testimony whereof I have signed this specification in the presence of two subscribing witnesses.

CHARLES MOUREU.

Witnesses:
GABRIEL BELLIAR,
AUGUSTUS E. INGRAM.

---

Correction in Letters Patent No. 750,213.

It is hereby certified that in Letters Patent No. 750,213, granted January 19, 1904, upon the application of Charles Moureu, of Paris, France, for an improvement in "Ether of Propiolic Acid, &c.," an error appears in the printed specification requiring correction, as follows: In line 9, page 2, the last element of the formula "CH," should read $CH_3$; and that the said Letters Patent should be read with this correction therein that the same may conform to the record of the case in the Patent Office.

Signed and sealed this 14th day of June, A. D., 1904.

[SEAL.]

E. B. MOORE,
*Acting Commissioner of Patents.* parent liquids of agreeable aroma, non-crystallizable by ordinary methods at temperatures above 0° centigrade, almost insoluble in water, easily soluble in alcohol, ether, benzene and gasolene, and having the properties and characteristics herein specified.

2. A beta-ketonic ether of hexyl propiolic acid of the type $R.CO_2CH_2CO\ CH_2CH_2CH_2CH_2CH_2CH$, R being an alcoholic radical, said ethers being oily, colorless or practically colorless transparent liquids of agreeable aroma, non-crystallizable by ordinary methods at temperatures above 0° centigrade, almost insoluble in water, easily soluble in alcohol, ether, benzol and gasolene, and having the properties and characteristics herein specified.

In testimony whereof I have signed this specification in the presence of two subscribing witnesses.

CHARLES MOUREU.

Witnesses:
GABRIEL BELLIAR,
AUGUSTUS E. INGRAM.

---

Correction in Letters Patent No. 750,213.

It is hereby certified that in Letters Patent No. 750,213, granted January 19, 1904, upon the application of Charles Moureu, of Paris, France, for an improvement in "Ether of Propiolic Acid, &c.," an error appears in the printed specification requiring correction, as follows: In line 9, page 2, the last element of the formula "CH," should read $CH_3$; and that the said Letters Patent should be read with this correction therein that the same may conform to the record of the case in the Patent Office.

Signed and sealed this 14th day of June, A. D., 1904.

[SEAL.]

E. B. MOORE,
*Acting Commissioner of Patents.*

It is hereby certified that in Letters Patent No. 750,213, granted January 19, 1904, upon the application of Charles Moureu, of Paris, France, for an improvement in "Ether of Propiolic Acid, &c.," an error appears in the printed specification requiring correction, as follows: In line 9, page 2, the last element of the formula "$CH$," should read $CH_3$; and that the said Letters Patent should be read with this correction therein that the same may conform to the record of the case in the Patent Office.

Signed and sealed this 14th day of June, A. D., 1904.

[SEAL.]

E. B. MOORE,
*Acting Commissioner of Patents.*